Sept. 30, 1930.  G. H. CONDICT  1,777,035
PROCESS OF MAKING DENATURED ALCOHOL
Filed Dec. 21, 1923
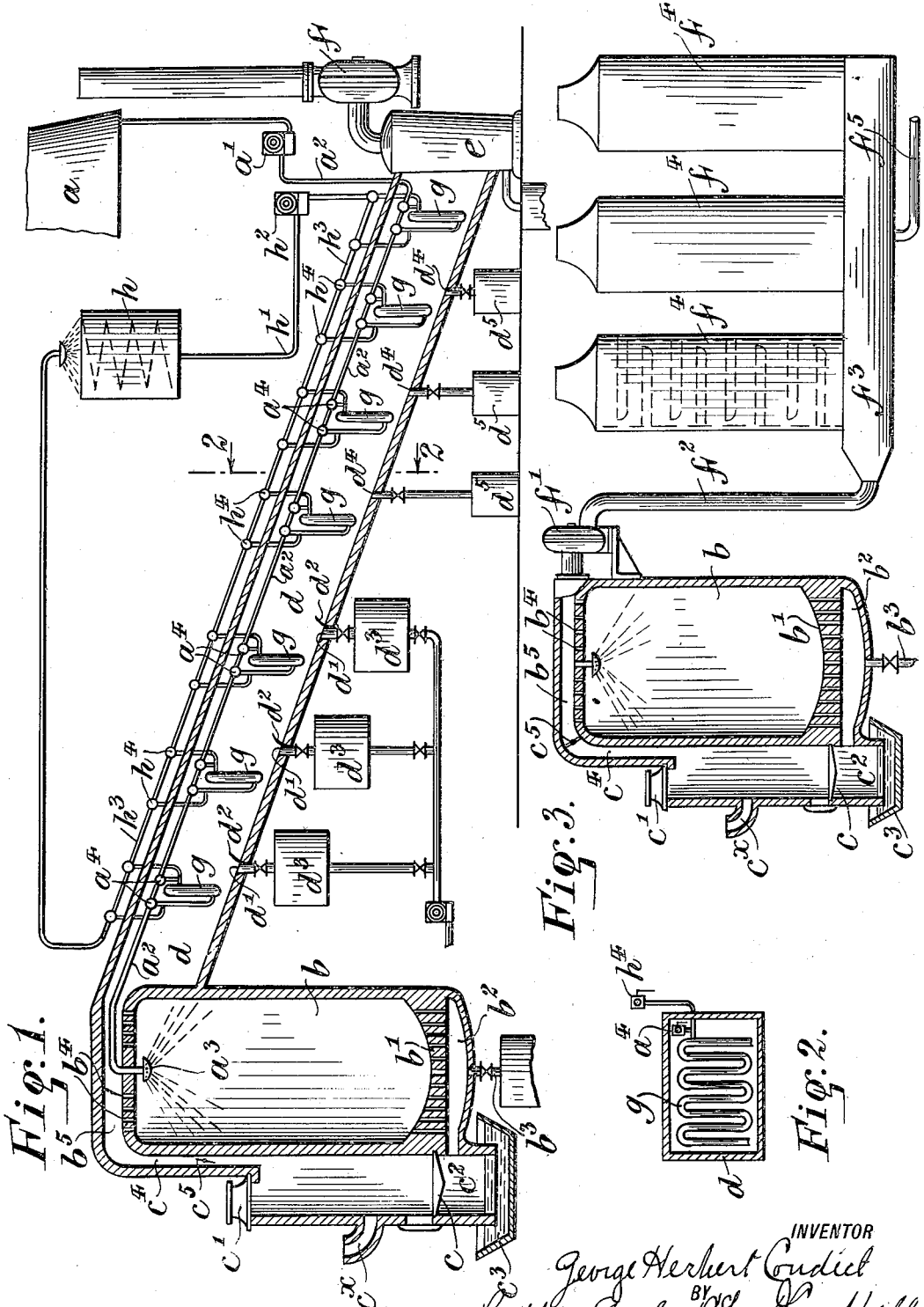
INVENTOR
George Herbert Condict
BY
Redding, Greeley, O'Shea & Campbell
ATTORNEYS Patented Sept. 30, 1930

1,777,035

UNITED STATES PATENT OFFICE

GEORGE HERBERT CONDICT, OF PLAINFIELD, NEW JERSEY

PROCESS OF MAKING DENATURED ALCOHOL

Application filed December 21, 1923. Serial No. 681,914.

My invention relates to certain new and useful improvements in the process of making denatured alcohol, reference being had to the accompanying drawings forming a part thereof.

This invention relates to the recovery of alcohol from alcohol-containing liquids and its denaturing. The alcohol-containing liquids from which the alcohol is to be recovered are commonly liquids which are or were formerly fermented for beverage purposes, such as beer, wines, etc., and the alcohol to be recovered from such liquids is mainly ethyl alcohol, but any alcohol-containing liquid can be taken as the source and ethyl alcohol or methyl alcohol or any kind of alcohol can be taken as the alcohol to be recovered. The general purpose of the invention is primarily the recovery of the alcohol and secondarily is the denaturing of the alcohol as it is separated from the residue of the liquid in which it is formed. More specifically the purpose is to facilitate and reduce the cost, as compared with other methods, of the separation of the alcohol from the residue liquid and to effect the denaturing of the alcohol as it is separated from the residue by the products of combustion from the same source of heat employed in the separation. In accordance with the invention the alcoholic liquid, that is, the liquid fermented or otherwise, which contains the alcohol as a constituent part thereof, is subjected to a temperature above the boiling point of alcohol being preferably introduced in a mist-like or finely divided condition into an atmosphere which is at a temperature above the boiling point of the alcohol, so that all, or a very large percentage of the alcohol, exposed to the required temperature, shall be evaporated from the globules of the alcoholic liquid, that is, shall be changed to gaseous form or vapor. The heated atmosphere into which the alcoholic liquid is introduced, is provided by the distructive distillation or combustion of vegetable fibre or other solid organic material which itself furnishes the heat necessary for the separation of the alcohol from the containing liquid and is capable of producing as a product of such combustion a substance adapted to denature alcohol. The invention will be explained more fully hereinafter with reference to the forms of apparatus chosen as adapted for the practice of the improved method. In the drawings in which such embodiments are illustrated:—

Figure 1 is a view, mainly in vertical, longitudinal section of one form of apparatus in which the invention may be practiced.

Figure 2 is a section on the plane indicated by the broken line 2—2 of Figure 1, looking in the direction of the arrow.

Figure 3 is a view partly in vertical section and partly in elevation of another form of apparatus.

In the apparatus illustrated in Figures 1 and 2 the alcoholic liquid is presumably delivered from a supply tank $a$ through a pump $a'$ and a pipe $a^2$ to a rose or spray nozzle or atomizing nozzle $a^3$ under sufficient head or pressure to be discharged in the form of spray or mist, that is, in finely divided form or as a cloud of globules, each of which is formed of the alcoholic liquid. It is thus delivered into a heated atmosphere which has a temperature above the temperature at which the alcohol will condense. For the practical carrying on of the method this atmosphere is confined or enclosed in a chamber $b$, this chamber $b$ receiving the products of combustion, which by reason of the fact that combustion of vegetable fibre or other commonly used solid organic fuel is practically always incomplete, carries substances of a denaturing quality, from the furnace or fire pot $c$ by which the atmosphere is heated. In the arrangement shown the chamber $b$ has a perforated bottom $b'$ through which the products of combustion may pass up into the chamber and through which any liquid which is not evaporated or is condensed after vaporizing in the chamber $b$, passes downward into a receiving pan $b^2$ from which it may flow off or be drawn off to an outlet $b^3$. The perforated bottom is provided for the purpose of insuring the proper distribution of the hot gaseous products of combustion as they enter the chamber $b$ and of heating the residue liquid sufficiently to drive off any alcohol that may have been carried down with it. The uncondensed vapors, mainly alcohol vapor, pass off through the top $b^4$. The furnace $c$ is preferably of the down-draft type, being provided with an air inlet $c^x$ and a suitable fuel lock, indicated at $c'$, through which the wood or other solid organic material can be introduced without excess of air and without escape of the products of combustion, while the chamber $c^2$, below the grate, communicates directly with the chamber $b^2$, and may be provided with a suitable water-seal $c^3$. The furnace is also provided with a flue $c^4$, equipped with a suitable regulating valve or damper $c^5$, through which a portion of the products of combustion may be permitted to escape and mingle, if desired, with the vapors which pass from the chamber $b$. The hot gaseous products of combustion, entering chamber $b$, raise the temperature therein to the required degree, sufficient to vaporize each globule of the alcoholic liquid thus exposed to the desired temperature, thus releasing its alcoholic content. At the same time, since the products of combustion carry a denaturant constituent, the alcohol, as it is separated from the residue liquid of each globule, absorbs such denaturant. The globules of unvaporized liquid, or of liquid which has condensed after vaporization in chamber $b$, quickly coalesce and the liquid body thus formed, alcohol-free or nearly alcohol-free, falls in the chamber $b$ and escapes therefrom, while the alcohol vapor, set free in the chamber $b$ and carrying with it but little water from the chamber $b$ passes thence into the condenser or rectifier which is supplied with the denaturant atmosphere through flue $c^4$.

In the arrangement shown in Figure 1 the separating and denaturing chamber $b$ is relatively high and has at its top a chamber $b^5$ with which communicates directly the upper end of the downwardly inclined condensing chamber $d$. At its lower end the condensing chamber $d$ communicates with a receiver $e$, which may also be a separator, from which the alcohol may flow off or be drawn off, while the uncondensed vapors, of whatever character are carried off by a suction fan $f$ by the operation of which a continuous current of gaseous products of combustion from the furnace or fire pot $c$ through chamber $b$ and condenser $d$ is created and maintained, carrying with it from the furnace or fire pot products of combustion containing more or less substances resulting from the necessarily incomplete combustion of the fuel employed, and carrying with it from chamber $b$ the alcohol vaporized by the heat of the products of combustion. This continuous current is maintained to the lower end of the condenser, the gases and vapors gradually cooling until before it enters the fan $f$ it has dropped below the boiling point of alcohol so that the alcohol impregnated with the denaturant substances absorbed from the atmosphere of chamber $b$, and probably also from the atmosphere in the condenser, condenses and at the same time the alcoholic liquid has its temperature raised somewhat. So also, if desired, cooling water from a suitable supply $h$ may be conducted through a pipe $h'$ and pump $h^2$ to a pipe $h^3$ which in turn may be connected, through suitable three-way valves $h^4$, to the pipe-coils $g$ and returned after cooling to the supply tank $h$.

In the form of apparatus shown in Figure 3, the chamber $b$ and the furnace $c$, with their appurtenances and connections are arranged as already described, while the fan $f'$, by which the movement of the vapors is promoted, is shown as disposed in close proximity to the chamber $b$ and as arranged to discharge the vapors, through a pipe $f^2$ and a header $f^3$, into vertical condensers $f^4$. The condensed alcohol may flow off or be drawn off through a pipe $f^5$ while the uncondensed vapors escape from the condensers $f^4$. The improved method is practiced in an apparatus of this form substantially as already described.

The temperature of the atmosphere into which the alcoholic liquid is introduced is preferably or under some conditions below the boiling point of the residue liquid, but experience has shown that the separation and denaturing of the alcohol will proceed if the temperature is considerably higher.

Many other forms of apparatus will readily suggest themselves and it will be understood that the invention is not restricted to any particular form of apparatus.

Having thus described my invention what I claim is:

1. The process of making denatured alcohol which comprises so effecting incomplete combustion of a solid organic combustible material as to produce as a product of such incomplete combustion a substance adapted to denature alcohol, introducing alcoholic liquid into an atmosphere containing such denaturant substances resulting from such incomplete combustion maintained by such incomplete combustion in such heated condition as to vaporize the alcoholic liquid, and condensing the resulting mixed vapors.

2. The process of making denatured alcohol which comprises so effecting incomplete combustion of a solid orgaic combustible material as to produce as a product of such incomplete combustion a substance adapted to denaturize alcohol, introducing alcoholic liquid into an atmosphere containing such denaturant substances resulting from such incomplete combustion maintained by such incomplete combustion at a temperature above the boiling point of alcohol whereby the alcohol is vaporized and condensing the resulting mixed vapors.

3. The process of making denatured alcohol which comprises so effecting incomplete combustion of a solid organic material as to produce as a product of incomplete combustion a substance adapted to denature alcohol, conducting the products of such incomplete combustion in an upwardly moving current maintained in heated condition by such incomplete combustion, introducing alcoholic liquid into said upwardly moving products of incomplete combustion from above in finely divided condition, and conducting the resultant vapors to a condenser.

4. The process of making denatured alcohol which comprises so effecting incomplete combustion of a solid organic combustible material as to produce as a product of such incomplete combustion a substance adapted to denature alcohol, conducting the products of combustion downward from the zone of active incomplete combustion and then upward to form an atmosphere containing products of incomplete combustion adapted to denaturize alcohol maintained at a heat above the boiling point of alcohol, introducing alcoholic liquid in finely divided condition into such heated atmosphere from above, and condensing the resulting vapors.

5. The process of making denatured alcohol which comprises so effecting incomplete combustion of a solid organic combustible material as to produce as a product of such incomplete combustion a substance adapted to denature alcohol, conducting the products of incomplete combustion in a continuous current decreasing in temperature from the relatively high heat of active combustion to a point at which it cools to a temperature below the boiling point of alcohol, introducing alcoholic liquid in finely divided condition into the portion of such current which is at a temperature above the boiling point of alcohol to cause the alcohol of the introduced liquid to be vaporized by the heat of such portion of the current mingled with the denaturant carried by such products of incomplete combustion and carried with such current in its progress to the point at which it is cooled below the boiling point of alcohol.

This specification signed this 20th day of December, A. D. 1923.

GEORGE HERBERT CONDICT.